Oct. 2, 1951   H. R. HARDING   2,569,471
COMBINED SPIGOT WASHER AND CONTRACTING LINER
Filed Dec. 9, 1949

INVENTOR.
HIRAM R. HARDING.
BY Howard J. Whelan.
ATTORNEY.

Patented Oct. 2, 1951

2,569,471

UNITED STATES PATENT OFFICE 2,569,471

COMBINED SPIGOT WASHER AND CONTRACTING LINER

Hiram R. Harding, Baltimore, Md.

Application December 9, 1949, Serial No. 132,156

3 Claims. (Cl. 251—160)

This invention relates to faucets and spigots of the conventional forms and more particularly to those employing replaceable seats or washers.

In the common form of faucet the wearing of the seat or washer permits it to leak after it has been used for some time. The placement of the composition washer on the stem of the device is the usual manner of repairing it and taking up the wear. However the washer is held in place by a fastening screw, and such screws vary in size or diameter in various faucets. This requires repair kits employed for replacing the washers to be in as many forms as the screw diameters vary. This is quite inconvenient and requires a large stock and often delays the repairs. In this invention, the kits are reduced to one size, and the old screw in the faucet stem is reused. Since the screw is available when the old worn washer is removed, it is ready for reuse when the repair is made. In order to make the kit in one standard size, a sleeve is provided that fits inside the washer, while at the same time, permitting the screws of any faucet to fit it also. The sleeve is of a form that adjusts itself to the various diameters and size screws and also adjusts itself so it will fit neatly. It has the advantage of being inexpensive and effective, while being more convenient to use.

It is therefore an object of this invention to provide a new and improved washer unit for faucets that will avoid one or more of the disadvantages and limitations of the prior art.

Another object of the invention is to provide a new and improved washer unit for a faucet that will enable repairs to be made by one size of the unit to suit several sizes and types of stems and washers used.

Other objects will become apparent as the invention is more fully set forth.

For a clearer understanding of the invention and its objects reference is made to the accompanying drawings and the construction indicated therein, while the claims emphasize the scope of the invention.

In the drawings.

Similar reference characters refer to the same parts throughout the drawings.

Figure 1:
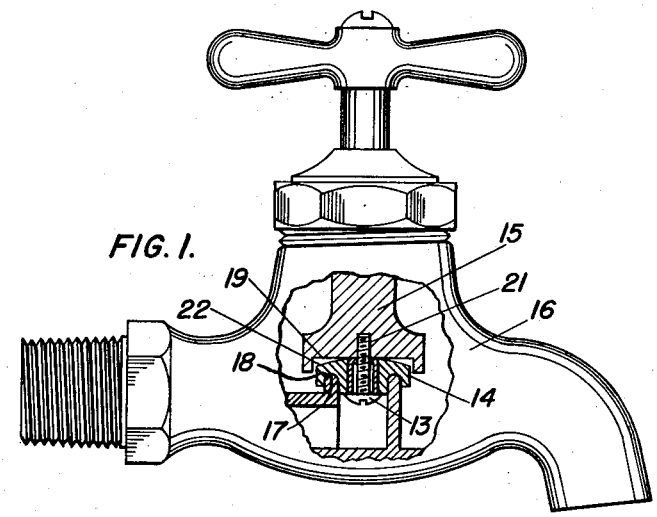
Figure 1 is a view in elevation of a faucet with a washer unit embodying this invention, the faucet being broken away to show the structure.
Figure 2:
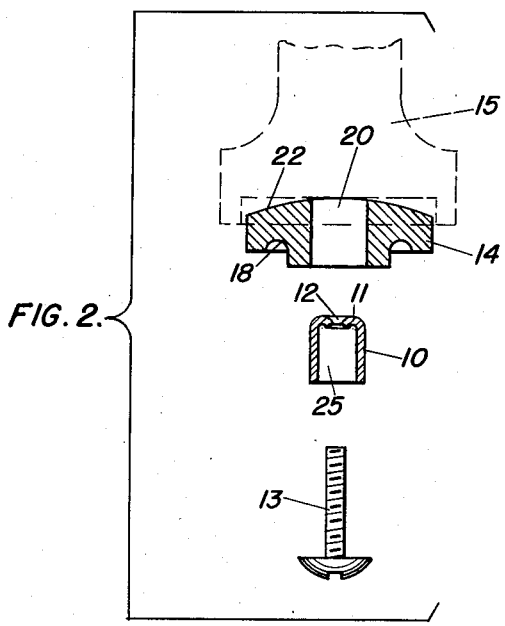
Figure 2 is an exploded view of the washer unit.

The device embodied in this invention consists primarily of a sleeve 10 of cylindrical form with one end portion 11 swaged inwardly at an angle or bevel and including a central hole 12 of a diameter equal to that of the largest screw 13 to be used therein to fasten the washer 14 to the stem 15 of a faucet 16. The faucet 16 is of conventional form having a seat 17 on which the face 18 of the washer 14 is screwed down on when closing the valve. The bottom 19 of the stem 15 is arranged to hold the washer 14 in a conventional manner, except that the sleeve 10 is inserted within the central hole 20 of the washer. Further the washer 14 can revolve on the stem and wear evenly thereon so it will keep its tightness for a longer period than if it was stationary.

When the sleeve is used, it is inserted in the central hole 20 of the washer and the screw 13 is inserted and slipped through until it engages in the threaded hole 21 in the stem. It is screwed in until it brings the end portion 11 of the sleeve 10 and the face 22 of the washer 14 close against the bottom 19 of the stem 15. As the screw is forced in further, its head is pressed against the lower end of the sleeve 10 and forces the swaged portion 11 so its convexed surface is forced inwardly and downwardly and against the screw. It binds against the screw and makes it water tight, as long as the screw is of a size that permits its use. Ordinarily, the screws are 8/32; 8/24; 10/32 and 10/24. The sleeve 10 has an interior diameter 25 that will be larger than the largest size screw used. The hole 12 is made small enough to slip over the largest size screw, which is in this instance a No. 10 screw. A No. 8 screw can be passed through this hole and the portion 11 forced inwardly to encase the screw because the wall of the sleeve is thin enough to permit this flexure. Thus the sleeve can be used for either size screw. This fact has not been appreciated before. It enables the screw already in the faucet stem to be reused. The effect of the hole 12 is to provide a rim edge that will conform to whatever size screw is used, and therefore hold it and the washer effectively in alignment.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A washer unit of the class described comprising in combination, a washer having a central passage therein and its periphery formed to fit the seat of the head on a faucet stem, a hollow sleeve fitting in said passage and including a partly closed in end adapted to fit against said head and having a hole therethrough and hold the sleeve and washer in place in the head, said hole being so formed in the closed-in end as to permit it to adjust itself to the diameter of the screw when the latter is screwed therein.

2. A washer unit of the class described comprising in combination, a washer having a central passage therein and its periphery formed to fit the seat of the head on a faucet stem, a hollow sleeve fitting in said passage and including a partly closed-in end adapted to fit against said head and having a hole therethrough for the fastening screw of the head to pass therethrough and hold the sleeve and washer in place in the head, said hole being so formed in the closed-in end as to permit it to adjust itself to the diameter of the screw when the latter is screwed therein, said closed-in end being convexed and arranged to be pressed inwardly to the sleeve when so screwed and bind proportionally on said screw to make a tight joint therewith.

3. A washer unit of the class described comprising in combination, a washer having a central passage therein and its periphery formed to fit the seat of the head on a faucet stem, a hollow sleeve fitting in said passage and including a partly closed-in end adapted to fit against said head and having a hole therethrough for the fastening screw of the head to pass therethrough and hold the sleeve and washer in place in the head, said hole being so formed in the closed-in end as to permit it to adjust itself to the diameter of the screw when the latter is screwed therein, said closed-in end being convexed and arranged to be pressed inwardly to the sleeve when so screwed and bind proportionally on said screw to make a tight joint therewith, a passage being provided through the longitudinal dimension of the sleeve to be larger than the largest size of screw to be used therein for fastening and the hole in the closed in end to suit the largest size of screw, whereby the sleeve may be used for all sizes of screws between these sizes.

HIRAM R. HARDING.

REFERENCES CITED

The following references are of record in the file of this patent:

UNITED STATES PATENTS

| Number | Name | Date |
|---|---|---|
| 914,473 | Winfield | Mar. 9, 1909 |
| 933,770 | Newell | Sept. 14, 1909 |
| 2,277,251 | Palmer | Mar. 24, 1942 |